United States Patent [19]

Yamakawa et al.

[11] Patent Number: 4,529,883
[45] Date of Patent: Jul. 16, 1985

[54] MULTI-IMAGING APPARATUS FOR THE SCINTILLATION CAMERA

[75] Inventors: Tsutomu Yamakawa; Hirokatsu Yoshizawa, both of Ootawara, Japan

[73] Assignee: Tokyo Shibaura Denki Kabushiki Kaisha, Kawasaki, Japan

[21] Appl. No.: 414,939

[22] Filed: Sep. 3, 1982

[30] Foreign Application Priority Data

Oct. 14, 1981 [JP] Japan ................. 56-162812

[51] Int. Cl.$^3$ .............................. G01T 1/20
[52] U.S. Cl. ................. 250/363 S; 250/366; 250/369
[58] Field of Search ............. 250/363 R, 363 S, 369, 250/366, 360.1; 364/414; 378/99

[56] References Cited

U.S. PATENT DOCUMENTS

| | | | |
|---|---|---|---|
| 3,405,233 | 10/1968 | Anger | 250/363 R |
| 3,735,132 | 5/1973 | Carugati et al. | 250/360.1 |
| 3,904,530 | 9/1975 | Martone et al. | 250/369 |
| 4,075,485 | 2/1978 | Lijewski et al. | 250/369 |
| 4,115,693 | 9/1978 | McGrath | 250/363 S |

OTHER PUBLICATIONS

Toshiba Review, "Gamma Imager Newly Developed"; Kiyotaka Asahina et al., UDC 53.087.5: 616-073, 1977, 32-2.

Primary Examiner—Alfred E. Smith
Assistant Examiner—Carolyn E. Fields
Attorney, Agent, or Firm—Oblon, Fisher, Spivak, McClelland & Maier

[57] ABSTRACT

Multi-imaging apparatus for displaying isotope radiation distribution images derived from scintillation cameras, including a single processor including circuitry which enables a plurality of separate images taken respectively by scintillation cameras to be displayed or exposed on photographic film, and a display system including a cathode ray tube display device in combination with a photographic camera unit. Plural sets of X and Y-coordinate signals along with unblanking signals supplied from a plurality of the scintillation cameras are processed and the different images of the radioisotope distribution taken respectively by the different scintillation cameras are exposed on a single frame of an X-ray film.

8 Claims, 6 Drawing Figures

MULTI-IMAGING APPARATUS FOR THE SCINTILLATION CAMERA

BACKGROUND OF THE INVENTION

1. Field of the Invention

The present invention relates to an apparatus for displaying isotope radiation distribution images, which is employed with a scintillation camera used in nuclear medicine, and more particularly to improvements in the display systems for a scintillation camera system that employs a plurality of detector heads.

2. Description of the Prior Art

When radiation emitted from a radioactive isotope introduced into a foreground subject is conducted to a scintillator through a collimator, the scintillator gives forth fluorescent rays. Since the position of the scintillation point corresponds to the position of a radioactive isotope present in the foreground subject, the plane distribution of the radioactive isotope is observed in the form of an image of light given forth by the scintillator.

In general, such an image is usually reproduced on the screen of a cathode ray tube, as a momentary spot of light at a point spatially corresponding to the position from which radiation emanates from a subject. Each unit of detected radiation is individually displayed, one at a time, as a dot on the cathode ray tube screen. A composite of many such dots recorded photographically forms an image of the radioisotope distribution in the subject.

A well-known scintillation camera is described in U.S. Pat. No. 3,011,057, issued Nov. 28, 1961, for Radiation Image Device, to Hal O. Anger. Systems and methods for recording the distribution of a radioactive substance on X-ray film are described in U.S. Pat. No. 4,115,693 and U.S. Pat. No. 4,075,485.

A detector head includes a scintillator for giving forth fluorescent rays upon absorption of radiation emitted from a radioactive isotope taken into the foreground subject and a plurality of photomultipliers for detecting fluorescent rays from the scintillator through a light guide and converting the rays to electrical signals.

A given scintillation results in a number of simultaneous output signals from the photomultipliers. These electrical signals are amplified and processed by electrical circuitry which is, in turn, connected to a cathode ray tube (CRT). These signal are processed and applied to the horizontal and vertical deflection circuits of the CRT. Signals corresponding to the intensity of a given scintillation, termed Z axis signals, are also processed by the circuitry for permitting production of an electron beam in the CRT. The processing circuitry also includes a pulse height analyzer, which determines whether a detected scintillation has resulted from radiation within a desired energy level range. If a given scintillation is within a desired intensity level range, the pulse height analyzer circuitry permits the CRT to produce an electron beam which is deflected in accordance with the output signals from X and Y axis summing and ratio circuits which result from that scintillation. The X and Y axis summing and ratio circuits produce X and Y axis signals having a pulse height respectively corresponding to the position of the scintillation point along the X and Y axes. An illuminated point or spot on the CRT screen is thus produced at a location on the screen which corresponds to the X and Y location of the scintillation in the scintillator crystal.

There is also a control signal supplied from the scintillation camera to the CRT, termed a START/STOP signal, which allows the X-ray film to be exposed with the cathode ray tube for a predetermined period of time or a predetermined count operating at a lower level value. Corresponding with each START/STOP signal, by adding a predetermined offset voltage to the X and Y axis signals, the CRT beam is deflected to create an image at a desired area on the CRT screen and a plurality of individual images are exposed on a single frame of X-ray film.

However, in the emission CT system which is described in U.S. Pat. No. 3,970,853, issued July 20, 1976, for a Transverse Section Radionuclide Scanning System, or in the radioisotope imaging system combining a stationary scintillation camera with a mobile scintillation camera, the individual images taken at the same time by a plurality of detector heads would not be displayed on a single screen of the CRT and be exposed on a single frame of the X-ray film.

SUMMARY OF THE INVENTION

Accordingly, the principal object of this invention is to provide an improved multi-imaging apparatus which is capable of displaying the individual different images on the screen of the CRT and exposing the individual different images on a single frame of X-ray film.

Another object of the present invention is to provide a novel multi-imaging apparatus wherein X and Y axis signals supplied in parallel respectively from a plurality of detector heads, to which a DC offset voltage is added, are converted into composite video signals including X and Y axis signals in series.

A further object of this invention is to provide a novel multi-imaging apparatus which enables the different individual images taken at the same time from a plurality of detector heads to be exposed on a single frame of the X-ray film.

Yet another object of this invention is to provide a novel multi-imaging apparatus capable of obtaining the different images of a radioactive isotope taken at the same time by a plurality of detector heads in different directions on a single frame of the X-ray film.

A further object of the present invention is to provide a novel multi-imaging apparatus capable of accepting a plurality of images in parallel for displaying and recording.

These and other objects are achieved according to the invention by providing a novel multi-imaging apparatus for displaying isotope radiation distribution images, adapted for use with scintillation cameras, including selection means for selecting at least one from a plurality of scintillation cameras, buffer control means operated by the output of the selection means for producing a composite unblanking signal, buffer means operating by the output of the buffer control means for processing plural sets of X and Y-coordinate signals for producing modified X and Y-coordinate signals, exposure control means operating by the output of the selection means for producing a composite exposure control signal from exposure control signals supplied from the scintillation cameras, and display means including a cathode ray tube display device and a photographic camera where the images by the scintillation cameras are displayed and exposed in correspondence with the outputs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
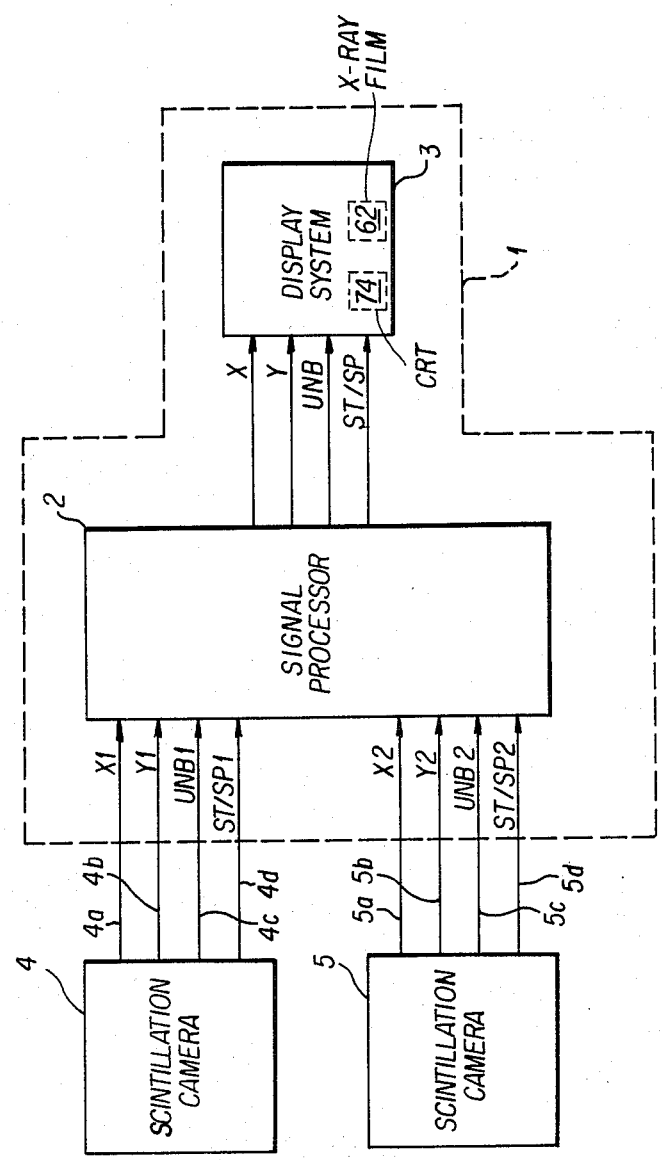
FIG. 1 is a schematic block diagram of a multi-imaging apparatus according to the invention.
Figure 2:
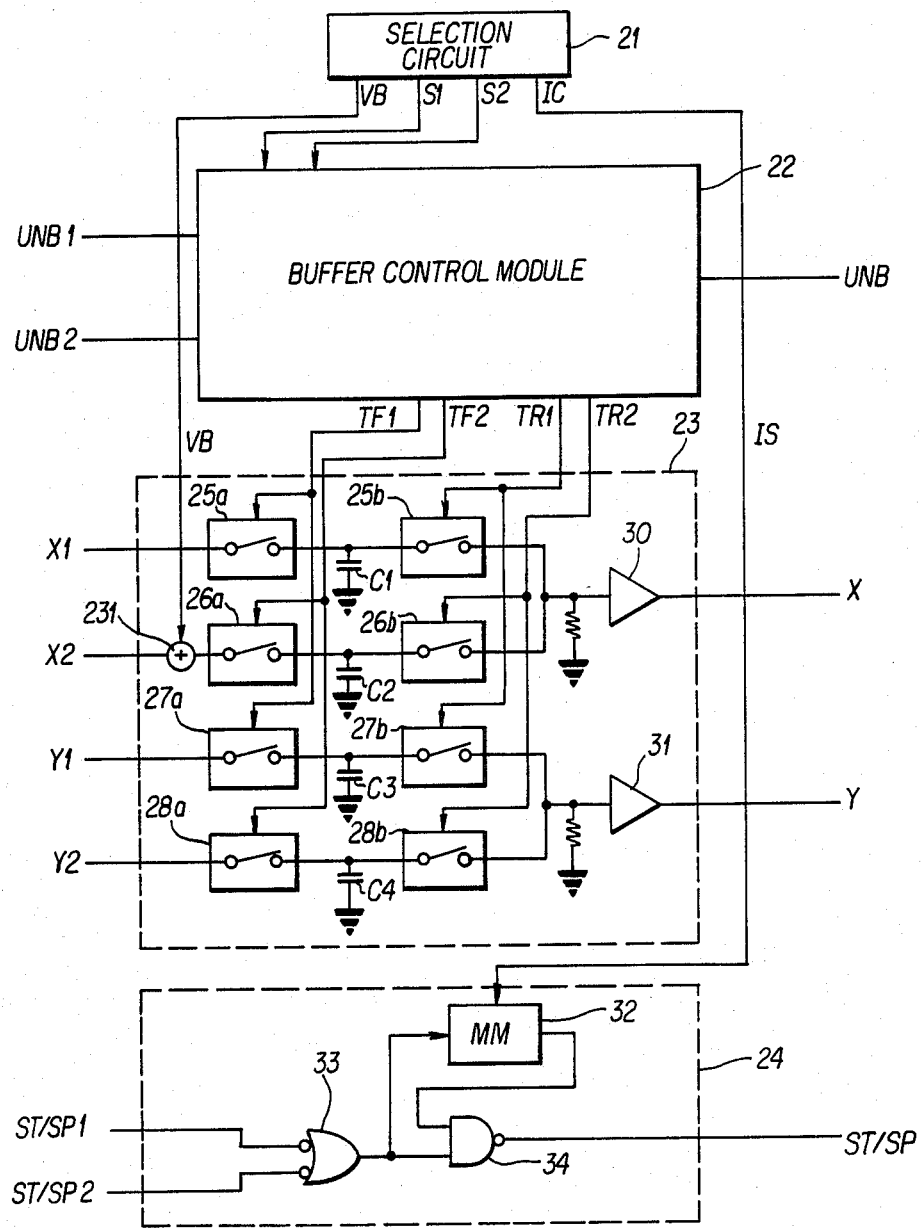
FIG. 2 is a detailed schematic block diagram of the signal processor of FIG. 1.

Referring now to the drawings, wherein like reference numerals designate identical or corresponding parts throughout the several views, and more particularly to FIGS. 1 and 2 thereof, a multi-imaging apparatus 1 includes a signal processor 2 including circuitry which enables a plurality of individual images taken respectively by two scintillation cameras 4 and 5 to be displayed or exposed on a single frame of X-ray film 62 and a display system 3 comprising a cathode ray tube display device in combination with a photographic camera unit.

The first camera 4 generates an analog representation of X and Y-coordinate signals X1,Y1 on lines 4a and 4b, respectively, along with a beam unblanking pulse UNB1 and a control signal ST/SP1 respectively on lines 4c and 4d which can be used to operate the CRT by the signal processor 2. Also the second camera 5 generates an analog representation of X and Y-coordinate signals X2,Y2 on lines 5a and 5b respectively, along with a beam unblanking pulse UNB2 and a control signal ST/SP2 respectively on lines 5c and 5d.

After the signal processor 2 has received this imaging information from the cameras 4,5, two sets of X and Y-coordinate signals, along with a beam unblanking pulse and a control pulse, are converted to a form required by the display system 3.

The X, Y and Z signals along with ST/SP signals modified by the signal processor 2 are supplied to the display system 3.

The signal processor illustrated in FIG. 1 is shown in detail in FIG. 2. The signal processor 2 includes a selection circuit 21 for producing selection control signals S1,S2 used for selecting the Z signals UNB1, UNB2 from scintillation cameras, a buffer control module 22 operating by the S1,S2 outputs of the selection circuit 21 for producing a composite Z signal UNB of the two Z signals UNB1,UNB2, a buffer module 23 coupled to the outputs of the buffer control circuit 22 for processing two sets of X and Y-coordinate signals and for producing modified X and Y-coordinate signals, and an exposure control module 24 coupled to the exposure signal IC of the selection circuit 21 for producing a composite exposure control signal ST/SP from two START/STOP signals ST/SP1,ST/SP2 of scintillation cameras 4,5 for enabling the display system 3 to start or stop an exposure.

The selection circuit 21 generates the selection control signals S1,S2 corresponding to the scintillation camera selected, which is supplied to the buffer control circuit 22. Selection circuit 21 further generates a d-c offset voltage VB which is supplied to an add circuit 231 of the buffer module 23 where it is added to X2, and the exposure signal IC which is supplied to monostable multivibrator MM32 of the exposure control module 24 when both of the scintillation cameras 4,5 are selected.

Figure 3:
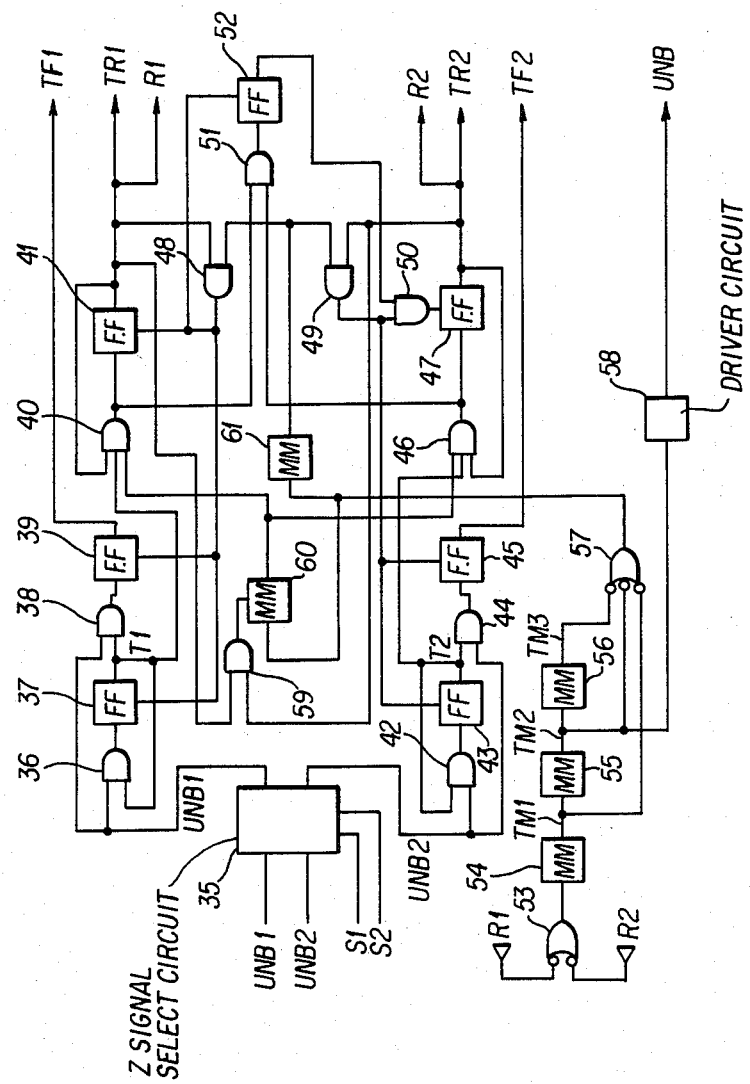
FIG. 3 is a detailed schematic block diagram of a buffer control module of FIG. 2.
Figure 4:
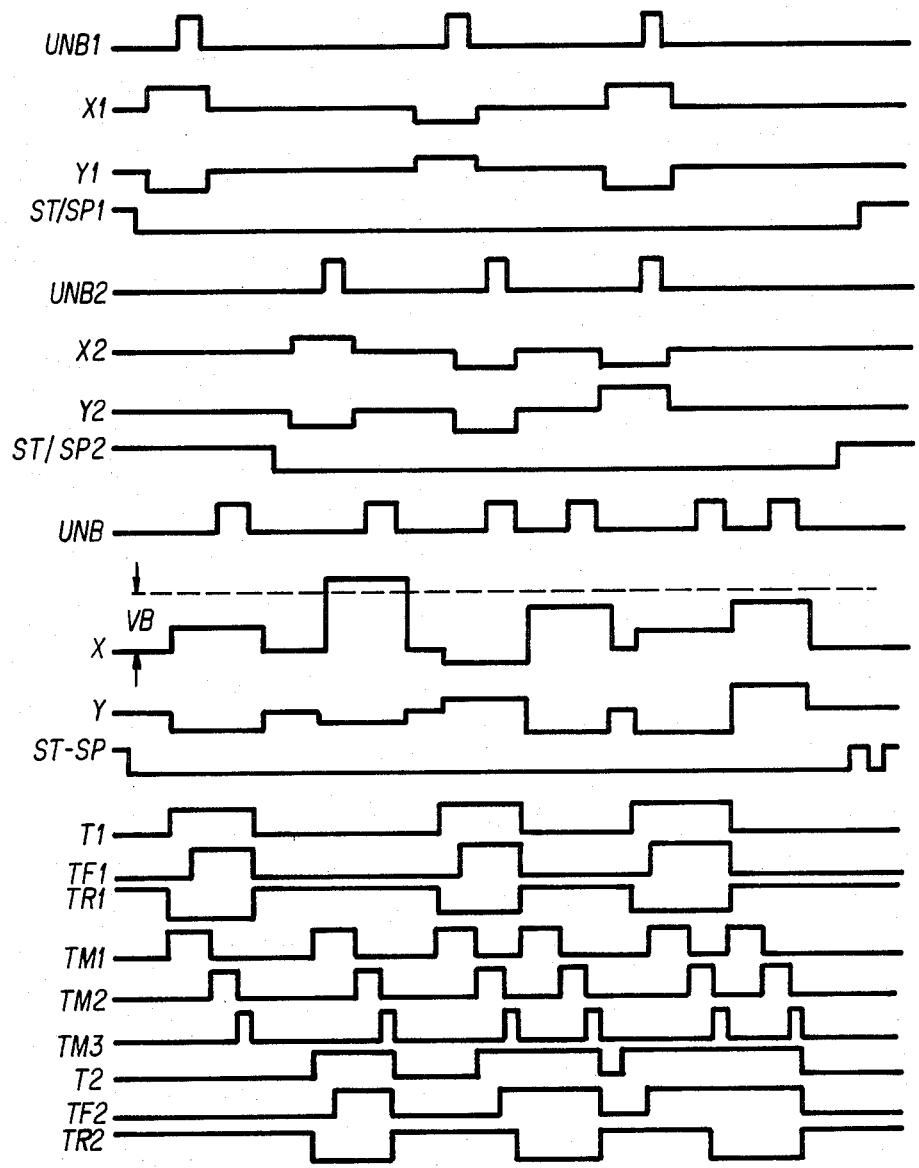
FIG. 4 is a timing diagram illustrating waveforms at the corresponding locations of the signal processor of FIG. 2 and FIG. 3.

Referring to FIGS. 3 and 4, the buffer control module 22 represented in FIG. 2 at 22 is disclosed in more detail in combination with a timing sequence diagram.

The UNB1 and UNB2 signals of the scintillation cameras 4,5 are directed to Z signal selection circuit 35 where one of the UNB1 and UNB2 signals is selected corresponding the output S1,S2 of the selection circuit 21.

When the X1 and Y1 signals along with the UNB1 signal are introduced prior to the X2 and Y2 signals along with the UNB2 signal, the T1 output of flip-flop 37 is directed through AND gate 38 to flip-flop FF 39 and also directed through AND gate 40 to flip-flop FF 41 and this will set flip-flops FF 39 and FF 41. The switches SW25b and SW27b of the buffer control module 23 are closed by operation of the TR1 output of flip-flop FF41. Note that with the closing of the switches SW25a and SW27a, the X1 and Y1 signals are respectively supplied through SW25a and SW27a to the capacitors C1 and C3 to be held. Accordingly, after the UNB1 signal changes from a high to a low state, the switches SW25a and SW27a are opened upon occurrence of the pulse of the TF1 output of flip-flop FF39 and then this will enable the capacitors C1 and C3 to hold the X1 and Y1 signals. With the closing of the switches SW25b and SW27b, the X1 and Y1 signals held by the capacitors C1 and C2 are supplied to the operation amplifiers OP30 and OP31, respectively.

Note that on the occurrence of the pulse of the TR1 output of flip-flop 41, monostable multivibrators MM54,MM55 and MM56 are triggered successively, and the TM2 output of monostable multivibrator MM55 is led to a driver circuit 58 for generating the composite Z signal. The TM3 output of monostable multivibrator MM56 is directed through NOR gate 57 to monostable multivibrator MM61 and the multivibrator MM61 is triggered. The output of the multivibrator MM61 is supplied through AND gate 48 to each of flip-flops FF37,FF39 and FF41 to clear these flip-flops.

Accordingly, the UNB2 signal, later received, is likewise processed as previously explained. When the following UNB2 signal is supplied to Z signal select circuit 35 under the presence of the TR1 output, the T2 output of flip-flop FF43 is directed through AND gate 44 to flip-flop FF45 for producing the TF2 output. The switches SW26a and SW28a are opened on the occurrence of the pulse of the TF2 output of flip-flop FF45 and then this will enable the capacitors C2 and C4 to hold the X2 and Y2 signals. The TR2 output is not generated from flip-flop FF47 by the presence of the TR1 output of flip-flop FF41, however, when the pulse of the TM3 output of monostable multivibrator MM56 is directed through the NOR gate 57 to monostable multivibrator MM61, this will enable flip-flop FF47 to produce the TR2 output. On the other hand, when the UNB1 signal which follows the UNB2 signal is supplied to Z signal select circuit 35 under the presence of the TR2 output, the operation is executed as previously explained.

When the X1 and Y1 signals along with the UNB1 signal and the X2 and Y2 signals along with the UNB2 signal are introduced to the Z signal selection circuit 35, the UNB1 signal is directed through AND gate 36 to flip-flop FF37 and this will trigger flip-flop FF37 to produce the T1 output signal. The T1 output of flip-flop FF37 is supplied through AND gate 38 to flip-flop FF39 and then the flip-flop FF39 is triggered so that the flip-flop FF39 produces the TF1 pulse signal.

On the other hand, when the UNB2 signal is directed through AND gate 42 to flip-flop FF43, this will trigger flip-flop 43 to supply the T2 pulse signal through the AND gate 44 to flip-flop FF45. The flip-flop FF45 produces the TF2 pulse signal. The switches SW25a, SW26a, SW27a and SW28a are operated by the TF1 and TF2 pulse signals supplied, and then X1 and Y1,X2 and Y2 signals are fed respectively into the capacitors C1,C2,C3 and C4 which are charged and hold the respective signal. The outputs of AND gates 40,46 are supplied in parallel to AND gate 51 and then this will set flip-flop FF52. The output of flip-flop FF52 is supplied through AND gate 50 to clear flip-flop FF47 on the occurrence of the TR1 output of the pulse of flip-flop FF41. Accordingly, the TR1 output of flip-flop FF41 is generated and then the TR2 output of flip-flop FF47 is generated, and first the X1 and Y1 signals held in the capacitors C1,C3 are supplied to operation amplifiers 30 and 31 respectively, and then nextly the X2 and Y2 signals held in the capacitors C2,C4 are supplied to operation amplifiers 30 and 31 respectively.

Referring to FIG. 2 and FIG. 4, the exposure control module 24 includes NOR gate 33 to which the ST/SP1 and ST/SP2 signals of the scintillation cameras 4,5 are introduced, monostable multivibrator MM32 which is triggered on the occurrence of the negative edge of the pulse of the outputs of NOR gate 33 and produces a composite exposure control signal ST/SP by the presence of the exposure signal IC, and NAND gate 34 into which the output of NOR gate 33 and monostable multivibrator MM32 are fed and which generates the composite exposure control signal ST/SP.

Figure 5:
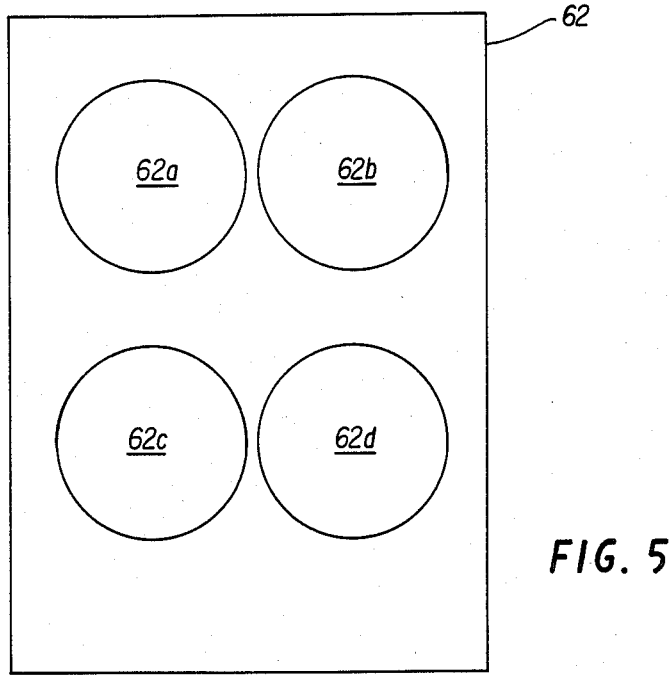
FIG. 5 is an illustraton a typical multi-imaging display format obtained by the multi-imaging apparatus employing the invention.

A typical multi-image display is shown in FIG. 5, wherein four separate images are displayed on the single frame of photographic film 62. For example, the first image of the radioisotope distribution in the subject taken by the scintillation camera 4 is displayed in the position of the frame, denoted as 62a, and the first image by the scintillation camera 5 is displayed in the position of the frame, denoted as 62b, and then by the next ST/SP signal, the second image by the scintillation camera 4 is displayed in the position of the frame, denoted as 62c, and the second image by the scintillation camera 5 is displayed in the position of the frame, denoted as 62d.

Figure 6:
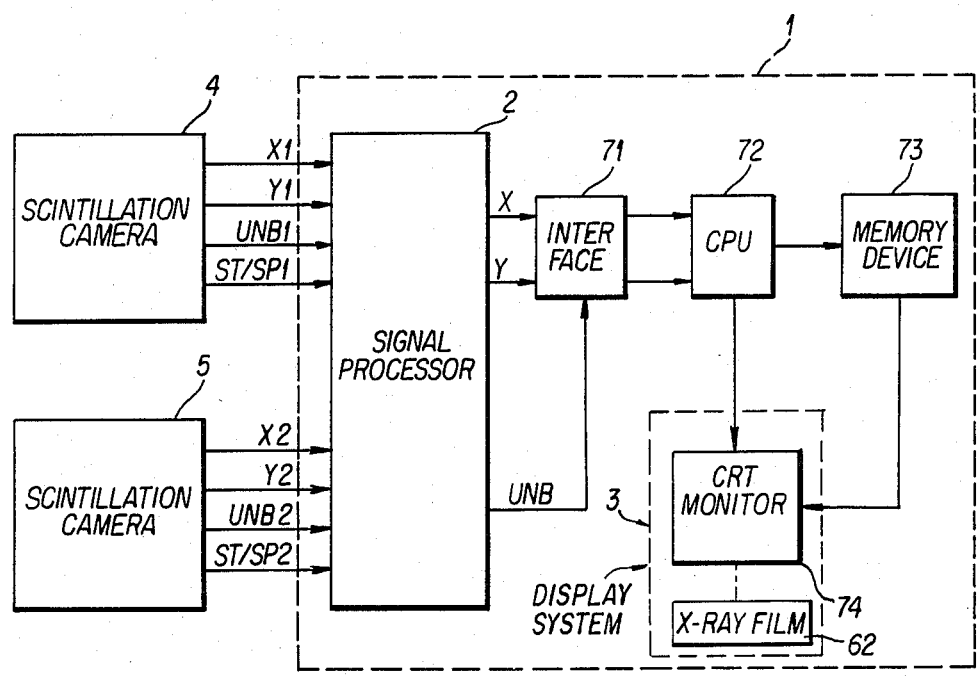
FIG. 6 is a block diagram of a second embodiment of the invention.

The essential features of a second embodiment of the multi-imaging apparatus are shown diagrammatically in FIG. 6.

In this embodiment, the multi-imaging apparatus 1 includes interface device 71 connected to the signal processor 2 where X and Y coordinate analog signals supplied from the signal processor 2 are converted to digital form by virtue of the generation of the composite unblanking signal UNB. The CPU 72 consists of, for example, a microcomputer, and is provided with a memory device 73, and the CRT or television monitor 74 where the images of the radioisotope distribution in the subject are displayed in correspondence with the outputs of the memory device 73 by virtue of the control of the CPU 72.

In summary, a multi-imaging apparatus is described in which plural sets of X and Y coordinates signals along with unblanking signals supplied from a plurality of the scintillation cameras are processed and the different images of the radioisotope distribution taken respectively by the different scintillation cameras are exposed on a single frame of the photographic film.

Obviously, numerous modifications and variations of the present invention are possible in light of the above teachings. It is therefore to be undertood that within the scope of the appended claims, the invention may be practiced otherwise than as specifically described herein.

What is claimed as new and desired to be secured by Letters Patent of the United States is:

1. A multi-imaging apparatus for simultaneously displaying isotope radiation distribution images from image data simultaneously produced by respective of plural scintillation cameras, said image data from each camera including X and Y coordinate signals, an exposure signal, and an unblanking signal, comprising:

selection means for producing selection control signals for sequentially selecting the image data produced by said plural scintillation cameras;

buffer control means controlled by said selection control signals for producing a composite unblanking signal based on the unblanking signals respectively produced by said plural cameras and for producing display timing signals;

buffer means controlled by said display timing signals for producing composite X and Y coordinate signals based on plural sets of X and Y coordinate signals produced by respective of said cameras;

exposure control means having applied thereto the exposure control signals produced by respective of said cameras for producing a composite exposure control signal based thereon; and display means for simultaneously producing and displaying individual images corresponding to the image signals produced by respective of said cameras in correspondence with said composite unblanking signal, said composite exposure signal, and said composite X and Y coordinate signals.

2. The multi-imaging apparatus as in claim 1 wherein said buffer means comprises:

means for adding a d-c offset voltage to the X-coordinate signal selected by said selection means.

3. The multi-imaging apparatus as in claim 2, comprising:

said buffer control means including an unblanking signal selection means for selecting one of plural unblanking signals supplied from said scintillation cameras in correspondence with a selection control signal of said selection means; and said buffer means including hold circuit means for holding plural sets of X and Y-coordinate signals controlled by the display timing signals of said buffer control means.

4. A multi-imaging apparatus according to claim 1, comprising;

interface means including an A/D convertor for converting said composite X and Y-coordinate signals to digital form by virtue of the generation of said composite unblanking signal;

memory means from sorting the radioisotope distribution in correspondence with the output of said interface means; and, producing means for controlling said memory means and said display means.

5. An apparatus according to claim 1, wherein said display means comprises:

CRT display means for simultaneously displaying said simultaneously produced individual images on a CRT screen.

6. a multi-imaging apparatus according to claim 5, comprising:

interface means including an A/D convertor for converting said composite X and Y-coordinate signals to digital form by virtue of the generation of said composite unblanking signal;

memory means for storing the radioisotope distribution in correspondence with the output of said interface means; and, producing means for controlling said memory means and said display means.

7. An apparatus according to claim 5, wherein said display means comprises:

means for simultaneously exposing said individually displayed images on a single X-ray sensitive film.

8. A multi-imaging apparatus according to claim 7, comprising:

interface means including an A/D convertor for converting said composite X and Y-coordinate signals to digital form by virtue of the generation of said composite unblanking signal;

memory means for storing the radioisotope distribution in correspondence with the output of said interface means; and, producing means for controlling said memory means and said display means.

* * * * *